United States Patent [19]

Brown

[11] 4,345,773
[45] Aug. 24, 1982

[54] LOAD LEVELING AIR PUMP WITH PRESSURE CLUTCH

[75] Inventor: Arthur K. Brown, South Bend, Ind.

[73] Assignee: The Bendix Corporation, Southfield, Mich.

[21] Appl. No.: 91,233

[22] Filed: Nov. 5, 1979

[51] Int. Cl.³ ............................................. B62D 37/00
[52] U.S. Cl. .................................. 280/6 R; 267/64.17; 280/711
[58] Field of Search .............................. 280/6 R, 711; 267/DIG. 1, DIG. 2, 65 D

[56] References Cited

U.S. PATENT DOCUMENTS

| | | | |
|---|---|---|---|
| 1,990,517 | 2/1935 | Bedford | 267/DIG. 1 |
| 2,021,043 | 11/1935 | Bedford | 267/DIG. 1 |
| 2,977,110 | 3/1961 | Kilgore | 267/DIG. 1 |
| 2,987,310 | 6/1961 | Ord | 267/DIG. 2 |
| 3,181,877 | 5/1965 | McHenry | 267/DIG. 1 |
| 3,208,760 | 9/1965 | Lucien | 267/DIG. 1 |

Primary Examiner—Joseph F. Peters, Jr.
Assistant Examiner—John A. Carroll
Attorney, Agent, or Firm—Paul David Schoenle; Ken C. Decker

[57] ABSTRACT

An automatic load leveling air pump is adapted for use with an air adjustable shock absorber to maintain a substantially constant vehicle height despite changes in vehicle loading. The pump includes a housing connected to the vehicle axle and a pump piston connected to the vehicle frame. A feedback device slides within the housing in response to a spring and to air pressure and includes a pair of relatively movable portions which cooperate to act as a clutch against the housing during compression strokes of the pump piston. The pump piston, the housing and the feedback device enclose a compression chamber. The feedback device moves in response to air pressure to control the compression ratio of the compression chamber as the vehicle height changes.

11 Claims, 2 Drawing Figures

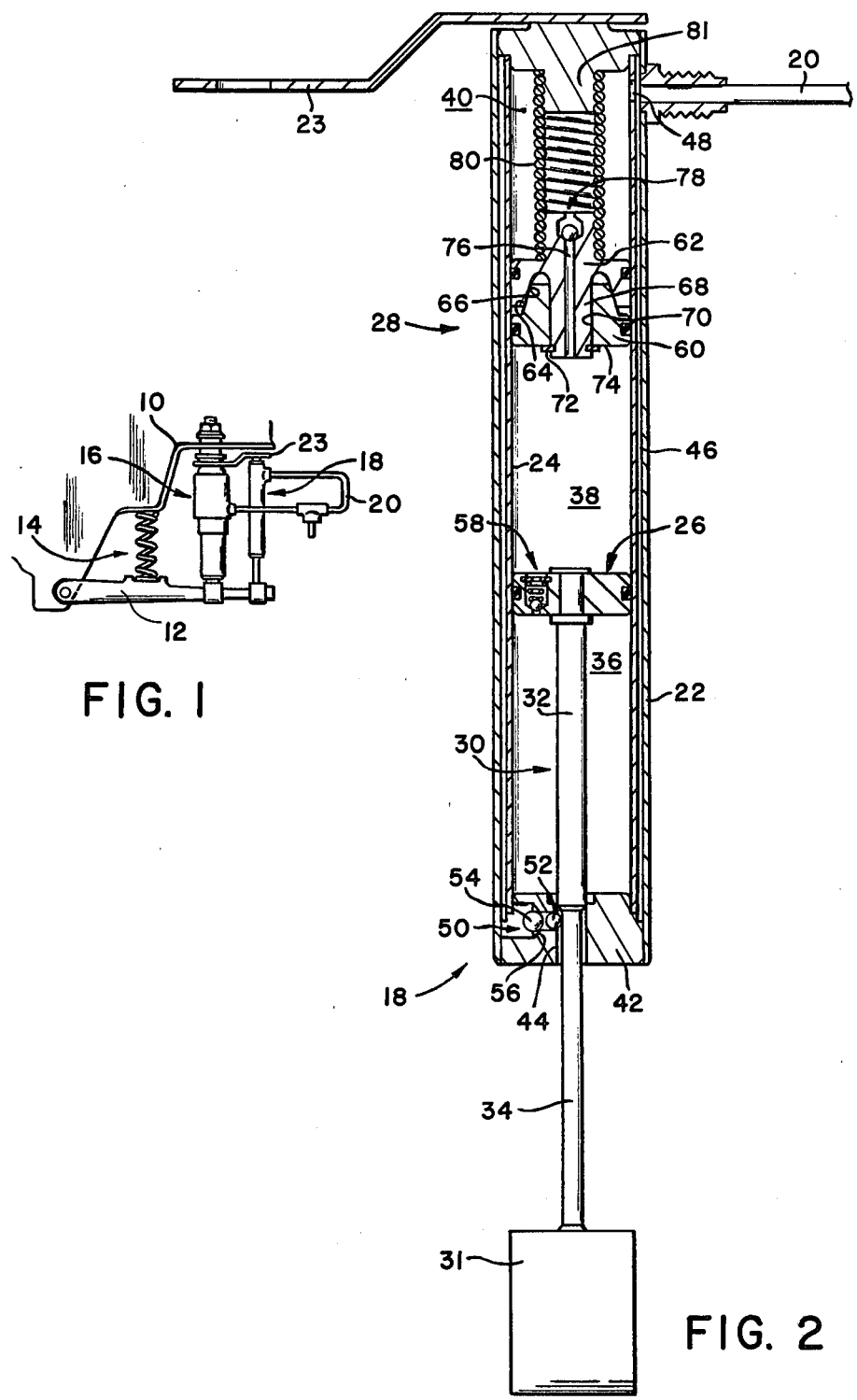

LOAD LEVELING AIR PUMP WITH PRESSURE CLUTCH

BACKGROUND OF THE INVENTION

This invention relates to an automatic load leveling pump for use in combination with conventional air adjustable shock absorbers or air bags.

Currently, automotive vehicles are available with either air or hydraulic automatic load leveling systems. An automatic system, such as is disclosed in U.S. Pat. No. 4,017,099 uses conventional air shocks with an electrically powered air compressor to extend the shocks and an electronic height sensing mechanism to control the amount of air pumped into the shocks by the compressor. Such systems are complex, costly, and they constitute a power drain on the vehicle electrical system. Hydraulic load leveling systems, such as are disclosed in U.S. Pat. Nos. 3,653,676, and 3,649,044, use engine-driven or electric motor-driven hydraulic pumps to pump hydraulic fluid into the rear shocks. Because of the incompressibility of the hydraulic fluid, a separate gas accumulator or a gas-filled shock is necessary to soften the ride characteristic. A mechanical height-sensing mechanism controls the amount of fluid pumped into the shocks. Also available are self-pumping load leveling shock absorbers whose pumping action is powered by the relative motion of the vehicle frame and axle. Such self-pumping shocks are complex and costly and suffer from reduced pumping efficiency as the shock absorber is extended.

The present invention provides an automatic load leveling air pump for use with an air adjustable shock absorber. The pump includes a housing connected to a vehicle axle and a pump piston connected to the vehicle frame. A feedback device slides in the housing in response to air pressure and defines a compression chamber in cooperation with the pump piston and the housing. The feedback device includes a pair of clutch portions which move together to radially expand one of the portions into frictional engagement with the housing upon compression of the pump. The feedback device moves in the housing in response to increasing shock absorber pressure to maintain a substantially constant compression ratio for the pump as the separation between the frame and axle increases. A mechanical height sensing valve cooperates with the pump to maintain a substantially constant separation between the frame and axle despite changes in vehicle loading.

SUMMARY OF THE INVENTION

This invention advantageously provides a load-leveling pump mechanism which is powered by relative motion of a vehicle frame and axle and which has an efficiency which is maintained as the separation of the frame and axle varies.

A further advantage of this invention is that it provides mechanical height sensing integral with the pump mechanism.

BRIEF DESCRIPTION OF THE DRAWINGS

FIG. 1 is a diagrammatic, fragmentary view of a portion of an automotive vehicle illustrating applicant's load leveling mechanism;

FIG. 2 is a longitudinal, cross-sectional view of an air pump used in the load-leveling mechanism illustrated in FIG. 1.

DETAILED DESCRIPTION

As shown in FIG. 1, an automotive vehicle (not shown), has a sprung mass or frame 10 pivotally supported from an unsprung mass or axle 12 by springs 14. An air adjustable shock absorber 16 and load leveling pump 18 are attached between the frame 10 and the axle 12. Connecting line 20 communicates air between pump 18 and the shock absorber 16.

FIG. 2 illustrates applicant's automatic load leveling pump 18 in cross section. Pump 18 includes a double-walled housing 22 connected to the frame 10 via support member 23. Housing 22 defines a bore 24 which slidably and sealingly receives pump piston 26 and feedback device 28. Piston rod 30 and connecting member 31 connect pump piston 26 with the axle 12. Rod 30 includes a larger diameter portion 32 and a smaller diameter portion 34. Piston 26, housing 22 and rod 30 cooperate to define an inlet chamber 36. Piston 26, housing 22, and feedback device 28, cooperate to define a compression chamber 38. Feedback device 28 and housing 22 cooperate to define an outlet chamber 40. End cap 42 includes an inlet bore 44 which receives rod 30 and through which air may communicate between atmosphere and inlet chamber 36. A control passage 46 is defined by the space between the double-walled portions of housing 22. An outlet port 48 communicates outlet chamber 40 with line 20 and with control passage 46. End cap 42 also includes a control valve 50 which controls communication between control passage 46 and inlet bore 44. Control valve 50 includes a ball 52 engageable with rod 30 and a ball 54 which is engageable with valve seat 56. Ball 52 moves when engaged by the larger diameter rod portion 32 to move ball 54 away from valve seat 56 to open communication between control passage 46 and inlet 44. Piston 26 includes a check valve 58 which permits one-way flow of air from inlet chamber 36 into compression chamber 38.

Feedback device 28 includes a pair of relatively movable feedback pistons 60 and 62. Pistons 60, 62 include corresponding outer and inner frusto-conical surfaces 64 and 66, respectively. A cylindrical portion 68 of feedback piston 62 extends through an axial bore 70 in piston 60. An end of cylindrical portion 68 includes a snap ring 72 which forms an abutment for engaging surface 74 of feedback piston 60. Feedback piston 62 includes axial passage 76 with check valve 78 for one-way fluid communication from compression chamber 38 to outlet chamber 40. Feedback spring 80 is attached to feedback piston 62 and to end cap 81 of housing 22 and exerts a force on feedback device 28 which opposes the force on feedback device 28 due to air pressure in outlet chamber 40 and in shock absorber 16.

MODE OF OPERATION

The frame 10 and axle 12 of an automotive vehicle at rest can be described as having a neutral or average separation. The separation or distance between frame 10 and axle 12 of the vehicle varies as a function of the load carried by the vehicle when the latter is not moving, the force exerted by spring 14, and the air pressure level in shock absorber 16. The motion of the vehicle over an uneven road surface causes the separation of the frame 10 and axle 12 to vary in an oscillatory manner about this neutral separation. The pump mechanism 18 operates to control the amount of air and thus, the air pressure in the shock absorber 16 to maintain a substantially constant average separation between the frame 10 and axle 12, regardless of changes in the amount of load carried by vehicle.

Pump 18, illustrated in FIGS. 1 and 2, operates to transfer air to the shock absorber 16 as the frame 10 and the axle 12 move toward each other. First, assume that the vehicle is at rest in an unloaded condition such that the frame 10 or support member 23 and axle 12 have an initial average separation as shown. This initial average separation is maintained because the control passage 46 is sealed from atmosphere and from inlet chamber 36 by control valve 50 so that air is prevented from escaping from shock absorber 16.

Now, if the vehicle is driven over an uneven road surface, the frame 10 and axle 12 will move relative to one another and oscillate about the initial average separation. As the frame 10 moves toward the axle 12, the piston 26 compresses the air in compression chamber 38. At the same time, the air in shock absorber 16 and in outlet chamber 40 is compressed. This increase in pressure in chambers 38 and 40 causes the feedback pistons 60 and 62 to move toward one another. The frusto-conical surfaces 64 and 66 engage each other and the outer surface of feedback piston 62 is thereby expanded into frictional engagement with the wall of bore 24 to prevent movement of the feedback device 28 relative to housing 22 as piston 26 continues on the compression stroke. As piston 26 continues on the compression stroke check valve 78 opens to permit air to be transferred from the compression chamber 38 into outer chamber 40 and through outlet 48 and line 20 to shock absorber 16.

When the frame 10 moves away from the axle 12, the piston 26 is on its extension stroke as it moves away from end cap 81. As piston 26 moves on the extension stroke check valve 78 closes to prevent air from escaping outlet chamber 40 and from the shock absorber 16 and back into compression chamber 38. At the same time check valve 58 opens to permit a new supply of air to enter into compression chamber 38 to be compressed and transferred to shock absorber 16 on the next compression stroke of piston 26. If piston 26 continues on the extension stroke and the frame 10 and axle 12 move further apart than the neutral separation shown in FIG. 2, eventually a predetermined amount of separation between the frame 10 and axle 12 may be achieved wherein the larger diameter portion 32 of piston rod 30 engages ball 52 of check valve 50. This engagement causes ball 52 to move ball 54 of check valve 50 away from valve seat 56, thus opening communication between shock absorber 16 and atmosphere via line 20, control passage 46 control valve 50 and inlet 44. Assuming that the amount of air pumped into shock absorber 16 on the piston compression stroke is substantially the same as the amount of air lost from shock absorber 16 on the piston extension stroke, the frame 10 and axle 12 will continue to oscillate about this initial average separation until the vehicle stops or until the vehicle load is changed.

Now assume that more load is added to the vehicle at rest, such as when additional passengers are carried. The additional load causes the frame 10 to move down toward the axle 12 to a smaller average separation until the increased weight is balanced by the tension of spring 14 and by the resistance of shock absorber 16. Now, when the vehicle moves over an uneven road surface the frame 10 and axle 12 oscillate about this new and smaller average separation. On the compression stroke of piston 26, the piston 26 compresses air in compression chamber 38 and transfers this air to shock absorber 16 just as in the unloaded condition previously described. On the extension stroke of piston 26 check valve 78 again closes, check valve 58 opens, and air enters compression chamber 38 from inlet chamber 36 in preparation for the next piston compression stroke. However, in this loaded condition, under normal circumstances, the maximum separation of frame 10 from axle 12 will be less than in an unloaded condition so that control valve 50 is opened less during each piston stroke by engagement with portion 32 of piston rod 30 and so that more air is transferred into shock absorber 16 during compression of pump 18 than escapes from shock absorber 16 during extension of pump 18. As a result, each full oscillation results in a net increase in the amount of air in shock absorber 16 and a net increase in the air pressure in shock absorber 16 and in outlet chamber 40.

The net increase in the air pressure in shock absorber 16 increases the average separation of the frame 10 and axle 12. At the same time this increased air pressure acts in outlet chamber 40 upon feedback device 28 to move feedback device 28 away from end cap 81 in housing 22 until the increased pressure in outlet chamber 40 is balanced by the resistance of feedback spring 80. Thus, as the average separation between frame 10 and axle 12 increases, so does the separation between feedback device 28 and end cap 81.

The compression ratio of pump 18 may be defined as the ratio of the maximum volume to minimum volume of the compression chamber 38 as piston 26 oscillates with respect to feedback device 28. The maximum volume of chamber 38 occurs when piston 26 is furthest from feedback device 28 at the limit of an extension stroke. The minimum volume of chamber 38 occurs when piston 26 is closest to feedback device 28 at the limit of a compression stroke. It should be noted that if feedback device 28 were fixed to housing 22, then both the maximum and minimum volumes of the compression chamber 38 would be increased by an identical amount as the average separation of the frame 10 and axle 12 increases, assuming pump oscillations of substantially constant amplitude. The compression ratio would therefore be decreased for increasing frame 10 and axle 12 separation since the compression ratio would be the ratio of the increased maximum volume to the increased minimum volume. Such a pump would therefore have efficiency which would deteriorate upon increasing average separation of the frame 10 and axle 12. However, in the instant invention, the feedback device 28 moves downwardly viewing FIG. 2 in response to increasing pressure in outlet chamber 40 to thereby lessen the amount by which the maximum and minimum volumes of compression chamber 38 are increased due to the increasing average separation of the frame 10 and axle 12. In this manner, the compression ratio and the pumping efficiency of applicant's pump 18 does not deteriorate or vary as would the compression ratio and pumping efficiency of a pump with a compression chamber fixed to the axle 12. The efficiency of applicant's pump 18 is further aided by the clutching action of feedback device 28 which holds feedback device 28 in position during the compression stroke of piston 26 so that piston 26 is able to closely approach feedback device 28 to transfer most of the air in compression chamber 38 into outlet chamber 40.

As the pump 18 continues to transfer air into the shock absorber 16 in response to the oscillatory movement of the frame 10 and axle 12, the average separation of the frame 10 and axle 12 continues to increase until a point is reached wherein control passage 46 is opened to atmosphere on the extension stroke of piston 26 by valve member 50 for a long enough period during each oscillation so that there is no further net increase in the amount of air in shock absorber 16. At this point, a final or loaded average separation is attained and the frame 10 and axle 12 continue to oscillate about this final average separation until once again the vehicle load is changed.

If, after a stable average separation is attained, the vehicle load is decreased, then the average separation of the frame 10 and axle 12 will increase in response to the tension of spring 14 and the air pressure in shock absorber 16. In this case valve member 50 will open to reduce the shock absorber air pressure if the separation of the frame 10 and axle 12 is larger than the predetermined separation wherein larger diameter rod portion 32 engages ball 52 of valve 50. Valve 50 will remain open to permit air to escape from shock absorber 16 until the separation falls to just under the predetermined separation. If the separation of frame 10 and axle 12 is not larger than the predetermined separation and the unloaded vehicle moves over an uneven road surface, then the frame 10 and axle 12 oscillate, and there will be a net decrease in the air pressure in shock absorber 16 for each full oscillation until a new stable average separation is attained wherein there is once again neither a net pressure loss or gain for each full oscillation. As average separation decreases and as the air pressure in outlet chamber 40 decreases, feedback spring 80 pulls feedback device 28 toward the end cap 81 so that the maximum and minimum volumes of compression chamber 38 and the compression ratio of pump 18 remain substantially unchanged. Feedback device 28 is able to move in response to the tension of feedback spring 80 because the tension on feedback piston 62 tends to separate feedback piston 62 from feedback piston 60 and tends to disengage their frusto-conical surfaces 64 and 66 to permit feedback piston 62 to contract out of frictional engagement with housing 22.

I claim:

1. An automatic load leveling mechanism for a vehicle having an unsprung mass, a sprung mass supported from the unsprung mass, and a fluid-receiving device for controlling the relative position of said masses, said masses having a variable average separation depending upon the amount of fluid within said fluid-receiving device and upon the weight of the sprung mass, said load leveling mechanism comprising:

a fluid pump for pumping fluid into said fluid-receiving device and powered by the relative movement of said masses in response to motion of said vehicle, said pump comprising a housing connected to one of said masses, a pump piston slidably mounted in said housing and connected to the other of said masses, the feedback means slidably mounted in said housing, said feedback means, said pump piston and said housing cooperating to define a compression chamber therebetween, said pump piston moving relative to said one mass to transfer fluid from said compression chamber to said fluid-receiving device, said feedback means being movable toward said pump piston in response to increasing fluid pressure in the fluid-receiving device; and fluid control means for permitting fluid to escape from the fluid-receiving device upon at least a predetermined separation of said masses;

said feedback means comprises a pair of relatively movable feedback pistons slidably and sealingly mounted in said housing, one of said feedback pistons comprising an expandible portion for frictional engagement with said housing, said feedback pistons including relatively engageable portions, said engageable portions being engageable with each other to expand said expandible portion into frictional engagement with said housing to limit movement of said feedback means within said housing as said pump piston moves to compress fluid in said compression chamber.

2. The load leveling mechanism of claim 1, wherein: said engageable portions comprise mating frusto-conical surfaces, said expandible portion surrounding said engageable portion of said other of said pair of feedback pistons.

3. The load leveling mechanism of claim 1, wherein said fluid control means comprises:

a rod for connecting said pump piston with said other mass, said rod including larger and smaller diameter portions;

a control passage defined by said housing for providing fluid communication between said fluid-receiving device and said reservoir; and a check valve in said control passage to prevent the escape of fluid from said fluid-receiving device, said check valve comprising rod engaging means engageable with one of said larger and smaller diameter rod portions to permit the escape of fluid from said fluid-receiving device upon at least said predetermined separation of said masses.

4. The load-leveling mechanism of claim 1, further comprising:

resilient means for opposing movement of said feedback means toward said pump piston.

5. The load leveling mechanism of claim 1, wherein: said pump piston comprises check valve means for allowing fluid flow into said compression chamber and for preventing fluid flow out of said compression chamber.

6. The load leveling mechanism of claim 1, wherein: said feedback means comprises check valve means for allowing fluid flow from said compression chamber into said fluid-receiving device and for preventing fluid flow from said fluid-receiving device into said compression chamber.

7. In a vehicle having an unsprung mass, a sprung mass supported from the unsprung mass, and a fluid-receiving device for controlling the relative position of said masses, said masses having a variable average separation depending upon the amount of fluid within said fluid receiving device and upon the weight of the sprung mass, a fluid pump for pumping fluid into said fluid-receiving device, said pump comprising:

a housing connected to one of said masses, a pump piston slidably and sealingly received by said housing and connected to the other of said masses, and feedback means slidably and sealingly received in said housing, said feedback means, said pump piston and said housing cooperating to define a compression chamber therebetween, said pump piston moving relative to said one mass to transfer fluid from said compression chamber to said fluid-receiving device, said feedback means being movable toward said pump piston in response to increasing fluid pressure in the fluid-receiving device to control the volume of said compression chamber;

said feedback means comprises a pair of relatively movable feedback pistons slidably and sealingly mounted in said housing, one of said feedback pistons comprising an expandible portion for frictional engagement with said housing, said feedback pistons including relatively engageable portions, said engageable portions being engageable with each other to expand said expandible portion into frictional engagement with said housing to limit movement of said feedback means within said housing as said pump piston moves to compress fluid in said compression chamber.

8. The fluid pump of claim 7 further comprising:

fluid control means for permitting fluid to escape from said fluid-receiving device upon at least a predetermined separation of said masses.

9. The fluid pump of claim 8, wherein said fluid control means comprises:

a rod for connecting said pump piston with said other mass, said rod including larger and smaller diameter portions;

a control passage defined by said housing for providing fluid communication between said fluid-receiving device and said reservoir; and a check valve in said control passage to prevent the escape of fluid from said fluid-receiving device, said check valve comprising rod engaging means engageable with one of said larger and smaller diameter rod portions to permit the escape of fluid from said fluid-receiving device upon at least said predetermined separation of said masses.

10. The fluid pump of claim 7, wherein:

said engageable portions comprise mating frustoconical surfaces, said expandible portion surrounding said engageable portion of said other of said pair of feedback pistons.

11. The fluid pump of claim 7, further comprising:

resilient means for opposing movement of said feedback means toward said pump piston.

* * * * *